(12) United States Patent
Chernokalov et al.

(10) Patent No.: US 9,812,902 B2
(45) Date of Patent: Nov. 7, 2017

(54) WIRELESS ELECTROMAGNETIC RECEIVER AND WIRELESS POWER TRANSFER SYSTEM

(75) Inventors: Alexander G. Chernokalov, Korolev (RU); Nikolay N. Olyunin, Perm (RU); Mikhail N. Makurin, Arkhangelsk (RU); Vladimir Y. Arkhipenkov, Mitischy (RU); Ki Young Kim, Yongin-si (KR); Young Ho Ryu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 808 days.

(21) Appl. No.: 13/612,105

(22) Filed: Sep. 12, 2012

(65) Prior Publication Data
US 2013/0062963 A1 Mar. 14, 2013

(30) Foreign Application Priority Data

Sep. 13, 2011 (RU) ................................ 2011137643
Aug. 9, 2012 (KR) ........................ 10-2012-0087361

(51) Int. Cl.
*H02J 5/00* (2016.01)
*H02J 17/00* (2006.01)

(52) U.S. Cl.
CPC ................ *H02J 17/00* (2013.01); *H02J 5/00* (2013.01)

(58) Field of Classification Search
CPC . H02J 5/005; H02J 7/025; H02J 17/00; H01F 38/14; B60L 11/182
USPC ...................................................... 307/104
See application file for complete search history.

(56) References Cited

U.S. PATENT DOCUMENTS

| | | | |
|---|---|---|---|
| 4,638,270 A * | 1/1987 | Machamer ............... | H03H 5/00 333/175 |
| 6,097,312 A | 8/2000 | Tanji et al. | |
| 2002/0125223 A1* | 9/2002 | Johnson et al. ......... | 219/121.43 |
| 2009/0079268 A1* | 3/2009 | Cook ..................... | H01Q 1/248 307/104 |
| 2009/0134711 A1* | 5/2009 | Issa et al. ..................... | 307/104 |
| 2009/0224609 A1* | 9/2009 | Cook et al. ................... | 307/104 |
| 2009/0243397 A1* | 10/2009 | Cook et al. ................... | 307/104 |
| 2010/0102640 A1 | 4/2010 | Joannopoulos et al. | |
| 2010/0109443 A1* | 5/2010 | Cook et al. ................... | 307/104 |

(Continued)

FOREIGN PATENT DOCUMENTS

| | | |
|---|---|---|
| JP | 2002-271896 A | 9/2002 |
| KR | 10-2010-0063756 A | 6/2010 |
| KR | 10-2011-0026644 A | 3/2011 |

OTHER PUBLICATIONS

Tole, Nimrod M., and Harald Ostensen. Basic Physics of Ultrasonographic Imaging. Geneva: World Health Organization, 2005. Print.*

*Primary Examiner* — Thienvu Tran
*Assistant Examiner* — David M Stables
(74) *Attorney, Agent, or Firm* — NSIP Law

(57) ABSTRACT

A system and a device for wirelessly transferring power without a cable are provided. A wireless electromagnetic receiver includes a first device configured to be magnetized based on an electromagnetic field. The wireless electromagnetic receiver further includes a second device configured to transform the magnetization of the first device into a power, the second device being not in contact with the first device.

23 Claims, 4 Drawing Sheets

(56) References Cited

U.S. PATENT DOCUMENTS

| | | | | |
|---|---|---|---|---|
| 2010/0194206 A1* | 8/2010 | Burdo | ................... | G06F 1/266 307/104 |
| 2010/0249670 A1* | 9/2010 | Smith | ................... | A61N 7/02 601/2 |
| 2010/0253089 A1* | 10/2010 | Huang | ................... | H01L 41/00 290/1 R |

* cited by examiner

WIRELESS ELECTROMAGNETIC RECEIVER AND WIRELESS POWER TRANSFER SYSTEM

CROSS-REFERENCE TO RELATED APPLICATION(S)

This application claims the benefit under 35 U.S.C. §119(a) of Russian Patent Application No. 2011137643, filed on Sep. 13, 2011, in the Russian Federal Service for Intellectual Property, and Korean Patent Application No. 10-2012-0087361, filed on Aug. 9, 2012, in the Korean Intellectual Property Office, the entire disclosures of which are incorporated herein by reference for all purposes.

BACKGROUND

1. Field

The following description relates to a system and a device for transferring power without a cable.

2. Description of Related Art

Electromagnetic wireless power transfer systems are classified into radiative systems and non-radiative systems. Radiative power transfer systems are based on narrow-beam transmitters, and utilize electromagnetic radiation in a far field. Non-radiative power transfer systems are based on electromagnetic induction, and utilize non-radiation in a near field.

Interest in non-radiative power transfer systems has grown significantly after a resonance power transfer scheme was proposed. Nearly all known resonance-based devices transferring wireless power are based on electromagnetic resonator structures. Resonator structures used for resonance power transfer systems may also be used in non-resonance systems, for example, radiative systems.

A drawback of electromagnetic resonator structures includes the complicated process of manufacturing a small-sized, sensitive electromagnetic resonator with a high quality factor (Q-factor, Q). Another drawback includes complications with production of an electromagnetic resonator including a high Q-factor but a low resonance frequency. To increase an efficiency of a power transfer process, it is desirable to a make Q-factor of an electromagnetic resonator as high as possible.

SUMMARY

In one general aspect, there is provided a wireless electromagnetic receiver including a first device configured to be magnetized based on an electromagnetic field. The wireless electromagnetic receiver further includes a second device configured to transform the magnetization of the first device into a power, the second device being not in contact with the first device.

The first device may include an integral solid-state mechanical resonator made of a magnetostrictive material, the integral solid-state mechanical resonator configured to be magnetized based on the electromagnetic field. The second device may include an inductive transducer configured to transform the magnetization of the integral solid-state mechanical resonator into the power, the inductive transducer being not mechanically-connected to the integral solid-state mechanical resonator.

The electromagnetic field may be at a frequency corresponding to a resonance frequency of the first device.

The second device may be further configured to maintain a quality factor (Q-factor) of the first device.

The first device may be made of a magnetostrictive material with a Q-factor including a value exceeding 2000.

The first device may be made of a magnetostrictive ferrite.

The first device may include a shape so that the power includes a peak value at an operating frequency.

The first device may include a shape of a cylinder.

The first device may include a shape of a bar with a square cross-section.

The first device may include a shape of a plate.

The wireless electromagnetic receiver may further include a permanent magnet configured to bias the first device.

The permanent magnet may be made of magnetic ceramics.

The second device may include a coil wound around the first device.

The wireless electromagnetic receiver may further include a load connected to ends of the coil.

In another general aspect, there is provided a wireless power transfer system including a transmitter configured to generate a magnetic field to transmit power. The wireless power transfer system further includes a wireless electromagnetic receiver configured to receive the power from the transmitter. The wireless electromagnetic receiver includes a first device configured to be magnetized based on the magnetic field. The wireless electromagnetic receiver further includes a second device configured to transform the magnetization of the first device into the power, the second device being not in contact with the first device.

The transmitter may include a non-radiative resonance structure with a resonance frequency f that is located at a distance less than a wavelength $\lambda$ from the wireless electromagnetic receiver, where $\lambda = c/f$, and c denotes a speed of light.

The transmitter may include a non-radiative non-resonance structure located at a distance less than a wavelength $\lambda$ from the wireless electromagnetic receiver, where $\lambda = c/f$, and c denotes a speed of light.

The transmitter may include a radiative structure with a frequency f that is located at a distance greater than a wavelength $\lambda$ from the wireless electromagnetic receiver, where $\lambda = c/f$, and c denotes a speed of light.

Other features and aspects will be apparent from the following detailed description, the drawings, and the claims.

Figure 1:
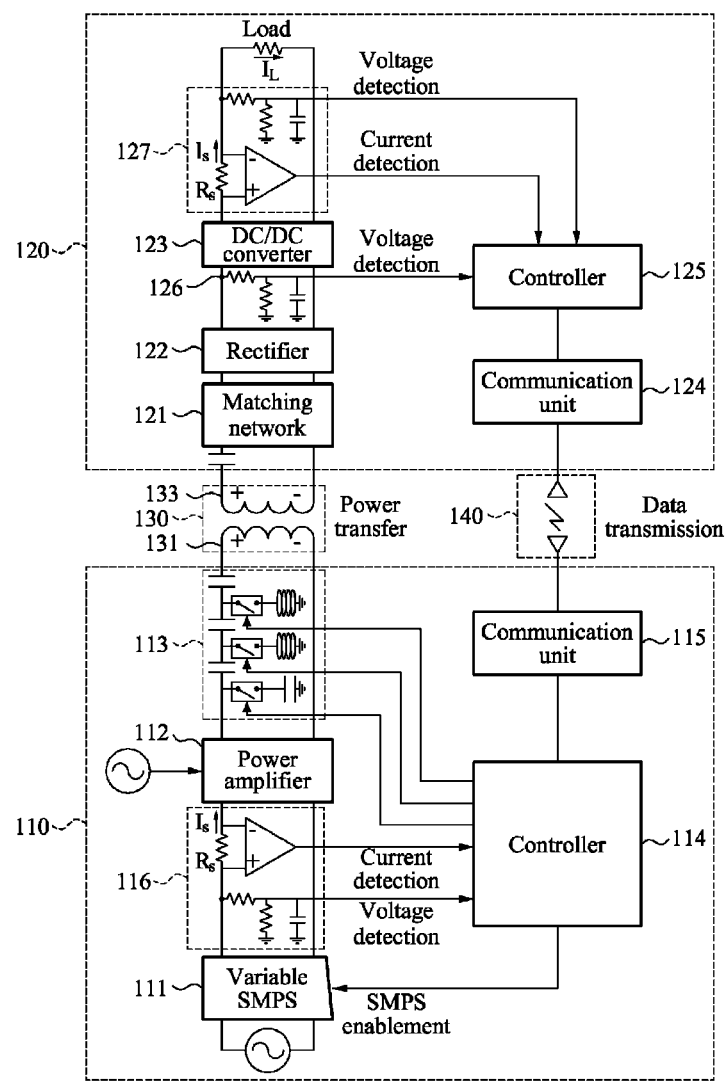
FIG. 1 is a diagram illustrating an example of a wireless power transfer system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein.

Accordingly, various changes, modifications, and equivalents of the systems, apparatuses, and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 is a diagram illustrating an example of a wireless power transfer system. Referring to FIG. 1, the wireless power transfer system includes a source device 110 and a target device 120. The source device 110 is a device supplying wireless power, and may be any of various devices that supply power, such as pads, terminals, televisions (TVs), and any other device that supplies power. The target device 120 is a device receiving wireless power, and may be any of various devices that consume power, such as terminals, TVs, vehicles, washing machines, radios, lighting systems, and any other device that consumes power.

The source device 110 includes a variable switching mode power supply (SMPS) 111, a power amplifier 112, a matching network 113, a controller 114, a communication unit 115, a power detector 116, and a source resonator 131. The target device 120 includes a matching network 121, a rectifier 122, a direct current-to-direct current (DC/DC) converter 123, a communication unit 124, a controller 125, a power detector 127, and a target resonator 133.

The variable SMPS 111 generates a DC voltage by switching an alternating current (AC) voltage having a frequency of tens of hertz (Hz) output from a power supply. The variable SMPS 111 may output a DC voltage having a predetermined level, or may output a DC voltage having an adjustable level by the controller 114.

The power detector 116 detects an output current and an output voltage of the variable SMPS 111, and provides, to the controller 114, information on the detected current and the detected voltage. Additionally, the power detector 116 detects an input current and an input voltage of the power amplifier 112.

The power amplifier 112 generates a power by converting the DC voltage output from the variable SMPS 111 to an AC voltage using a switching pulse signal having a frequency of a few kilohertz (kHz) to tens of megahertz (MHz). In other words, the power amplifier 112 converts a DC voltage supplied to a power amplifier to an AC voltage using a reference resonance frequency $F_{Ref}$, and generates a communication power to be used for communication, or a charging power to be used for charging that may be used in a plurality of target devices. The communication power may be, for example, a low power of 0.1 to 1 milliwatts (mW) that may be used by a target device to perform communication, and the charging power may be, for example, a high power of 1 mW to 200 Watts (W) that may be consumed by a device load of a target device. In this description, the term "charging" may refer to supplying power to an element or a unit that charges a battery or other rechargeable device with power. Also, the term "charging" may refer supplying power to an element or a unit that consumes power. For example, the term "charging power" may refer to power consumed by a target device while operating, or power used to charge a battery of the target device. The unit or the element may include, for example, a battery, a display device, a sound output circuit, a main processor, and various types of sensors.

In this description, the term "reference resonance frequency" refers to a resonance frequency that is nominally used by the source device 110, and the term "tracking frequency" refers to a resonance frequency used by the source device 110 that has been adjusted based on a predetermined scheme.

The controller 114 may detect a reflected wave of the communication power or a reflected wave of the charging power, and may detect mismatching between the target resonator 133 and the source resonator 131 based on the detected reflected wave. The controller 114 may detect the mismatching by detecting an envelope of the reflected wave, or by detecting an amount of a power of the reflected wave.

Under the control of the controller 114, the matching network 113 compensates for impedance mismatching between the source resonator 131 and the target resonator 133 so that the source resonator 131 and the target resonator 133 are optimally-matched. The matching network 113 includes combinations of a capacitor and an inductor that are connected to the controller 114 through a switch, which is under the control of the controller 114.

The controller 114 may calculate a voltage standing wave ratio (VSWR) based on a voltage level of the reflected wave and a level of an output voltage of the source resonator 131 or the power amplifier 112. When the VSWR is greater than a predetermined value, the controller 114 detects the mismatching. In this example, the controller 114 calculates a power transmission efficiency of each of N predetermined tracking frequencies, determines a tracking frequency $F_{Best}$ having the best power transmission efficiency among the N predetermined tracking frequencies, and changes the reference resonance frequency $F_{Ref}$ to the tracking frequency $F_{Best}$.

Also, the controller 114 may control a frequency of the switching pulse signal used by the power amplifier 112. By controlling the switching pulse signal used by the power amplifier 112, the controller 114 may generate a modulation signal to be transmitted to the target device 120. In other words, the communication unit 115 may transmit various messages to the target device 120 via in-band communication. Additionally, the controller 114 may detect a reflected wave, and may demodulate a signal received from the target device 120 through an envelope of the reflected wave.

The controller 114 may generate a modulation signal for in-band communication using various schemes. To generate a modulation signal, the controller 114 may turn on or off the switching pulse signal used by the power amplifier 112, or may perform delta-sigma modulation. Additionally, the controller 114 may generate a pulse-width modulation (PWM) signal having a predetermined envelope.

The communication unit 115 may perform out-of-band communication using a communication channel. The communication unit 115 may include a communication module, such as a ZigBee module, a Bluetooth module, or any other communication module, that the communication unit 115 may use to perform the out-of-band communication. The communication unit 115 may transmit or receive data 140 to or from the target device 120 via the out-of-band communication.

The source resonator 131 transfers electromagnetic energy 130, such as the communication power or the charging power, to the target resonator 133 via a magnetic coupling with the target resonator 133.

The target resonator 133 receives the electromagnetic energy 130, such as the communication power or the charging power, from the source resonator 131 via a magnetic coupling with the source resonator 131. Additionally, the target resonator 133 receives various messages from the source device 110 via the in-band communication.

The matching network 121 matches an input impedance viewed from the source device 110 to an output impedance viewed from a load. The matching network 121 may be configured with a combination of a capacitor and an inductor.

The rectifier 122 generates a DC voltage by rectifying an AC voltage received by the target resonator 133.

The DC/DC converter 123 adjusts a level of the DC voltage output from the rectifier 122 based on a voltage rating of the load. For example, the DC/DC converter 123 may adjust the level of the DC voltage output from the rectifier 122 to a level in a range from 3 volts (V) to 10 V.

The power detector 127 detects a voltage of an input terminal 126 of the DC/DC converter 123, and a current and a voltage of an output terminal of the DC/DC converter 123. The power detector 127 outputs the detected voltage of the input terminal 126, and the detected current and the detected voltage of the output terminal, to the controller 125. The controller 125 uses the detected voltage of the input terminal 126 to compute a transmission efficiency of power received from the source device 110. Additionally, the controller 125 uses the detected current and the detected voltage of the output terminal to compute an amount of power transferred to the load. The controller 114 of the source device 110 determines an amount of power that needs to be transmitted by the source device 110 based on an amount of power required by the load and the amount of power transferred to the load. When the communication unit 124 transfers an amount of power of the output terminal (e.g., the computed amount of power transferred to the load) to the source device 110, the controller 114 of the source device 110 may compute the amount of power that needs to be transmitted by the source device 110.

The communication unit 124 may perform in-band communication for transmitting or receiving data using a resonance frequency by demodulating a received signal obtained by detecting a signal between the target resonator 133 and the rectifier 122, or by detecting an output signal of the rectifier 122. In other words, the controller 125 may demodulate a message received via the in-band communication.

Additionally, the controller 125 may adjust an impedance of the target resonator 133 to modulate a signal to be transmitted to the source device 110. For example, the controller 125 may increase the impedance of the target resonator so that a reflected wave will be detected by the controller 114 of the source device 110. In this example, depending on whether the reflected wave is detected, the controller 114 of the source device 110 will detect a binary number "0" or "1".

The communication unit 124 may transmit, to the source device 110, any one or any combination of a response message including a product type of a corresponding target device, manufacturer information of the corresponding target device, a product model name of the corresponding target device, a battery type of the corresponding target device, a charging scheme of the corresponding target device, an impedance value of a load of the corresponding target device, information about a characteristic of a target resonator of the corresponding target device, information about a frequency band used the corresponding target device, an amount of power to be used by the corresponding target device, an intrinsic identifier of the corresponding target device, product version information of the corresponding target device, and standards information of the corresponding target device.

The communication unit 124 may also perform an out-of-band communication using a communication channel. The communication unit 124 may include a communication module, such as a ZigBee module, a Bluetooth module, or any other communication module known in the art, that the communication unit 124 may use to transmit or receive data 140 to or from the source device 110 via the out-of-band communication.

The communication unit 124 may receive a wake-up request message from the source device 110, detect an amount of a power received by the target resonator, and transmit, to the source device 110, information about the amount of the power received by the target resonator. In this example, the information about the amount of the power received by the target resonator may correspond to an input voltage value and an input current value of the rectifier 122, an output voltage value and an output current value of the rectifier 122, or an output voltage value and an output current value of the DC/DC converter 123.

The controller 114 of the source device 110 may set a resonance bandwidth of the source resonator 131. Based on the set resonance bandwidth of the source resonator 131, a Q-factor $Q_S$ of the source resonator 131 may be determined.

The controller 125 may set a resonance bandwidth of the target resonator 133. Based on the set resonance bandwidth of the target resonator 133, a Q-factor $Q_D$ of the target resonator 133 may be determined. In this example, the resonance bandwidth of the source resonator 131 may be set to be wider or narrower than the resonance bandwidth of the target resonator 133. By communicating with each other, the source device 110 and the target device 120 may share information regarding the resonance bandwidths of the source resonator 131 and the target resonator 133. When a power higher than a reference value is requested by the target device 120, the Q-factor $Q_S$ of the source resonator 131 may be set to a value greater than 100. When a power lower than the reference value is requested by the target device 120, the Q-factor $Q_S$ of the source resonator 131 may be set to a value less than 100.

In resonance-based wireless power transmission, a resonance bandwidth is a significant factor. If Qt indicates a Q-factor based on a change in a distance between the source resonator 131 and the target resonator 133, a change in a resonance impedance, impedance-mismatching, a reflected signal, or any other factor affecting a Q-factor, Qt is inversely proportional to a resonance bandwidth as expressed by the following Equation 1:

$$\frac{\Delta_f}{f_0} = \frac{1}{Qt} \qquad (1)$$
$$= \Gamma_{S,D} + \frac{1}{BW_S} + \frac{1}{BW_D}$$

In Equation 1, $f_0$ denotes a center frequency, $\Delta f$ denotes a bandwidth, $\Gamma_{S,D}$ denotes a reflection loss between resonators, $BW_S$ denotes a resonance bandwidth of the source resonator 131, and $BW_D$ denotes a resonance bandwidth of the target resonator 133.

An efficiency U of wireless power transmission may be expressed by the following Equation 2:

$$U = \frac{\kappa}{\sqrt{\Gamma_S \Gamma_D}} = \frac{\omega_0 M}{\sqrt{R_S R_D}} = \frac{\sqrt{Q_S Q_D}}{Q_\kappa} \quad (2)$$

In Equation 2, $\kappa$ denotes a coupling coefficient of energy coupling between the source resonator 131 and the target resonator 133, $\Gamma_S$ denotes a reflection coefficient of the source resonator 131, $\Gamma_D$ denotes a reflection coefficient of the target resonator 133, $\omega_0$ denotes a resonance frequency, M denotes a mutual inductance between the source resonator 131 and the target resonator 133, $R_S$ denotes an impedance of the source resonator 131, $R_D$ denotes an impedance of the target resonator 133, $Q_S$ denotes a Q-factor of the source resonator 131, $Q_D$ denotes a Q-factor of the target resonator 133, and $Q_\kappa$ denotes a Q-factor of energy coupling between the source resonator 131 and the target resonator 133.

As can be seen from Equation 2, the Q-factor has a great effect on an efficiency of the wireless power transmission. Accordingly, the Q-factor may be set to a high value to increase the efficiency of the wireless power transmission. However, even when $Q_S$ and $Q_D$ are set to high values, the efficiency of the wireless power transmission may be reduced by a change in the coupling coefficient $\kappa$ of the energy coupling, a change in a distance between the source resonator 131 and the target resonator 133, a change in a resonance impedance, impedance mismatching, and any other factor affecting the efficiency of the wireless power transmission.

If the resonance bandwidths $BW_S$ and $BW_D$ of the source resonator 131 and the target resonator 133 are set to be too narrow to increase the efficiency of the wireless power transmission, impedance mismatching and other undesirable conditions may easily occur due to insignificant external influences. In order to account for the effect of impedance mismatching, Equation 1 may be rewritten as the following Equation 3:

$$\frac{\Delta f}{f_0} = \frac{\sqrt{VSWR} - 1}{Qt\sqrt{VSWR}} \quad (3)$$

The source device 110 may wirelessly transmit wake-up power used to wake up the target device 120, and may broadcast a configuration signal used to configure a wireless power transfer network. The source device 110 may receive, from the target device 120, a search frame including a value of a receiving sensitivity of the configuration signal, may permit a join of the target device 120, and may transmit an ID used to identify the target device 120 in the wireless power transfer network. Additionally, the source device 110 generates charging power through power control, and wirelessly transmits the charging power to the target device 120.

Additionally, the target device 120 may receive wake-up power from at least one of source devices, and may activate a communication function of the target device 120 using the wake-up power. The target device 120 may receive a configuration signal used to configure a wireless power transfer network of each of the source devices, may select the source device 110 based on a receiving sensitivity of the respective configuration signal, and wirelessly receives power from the selected source device 110.

Figure 2:
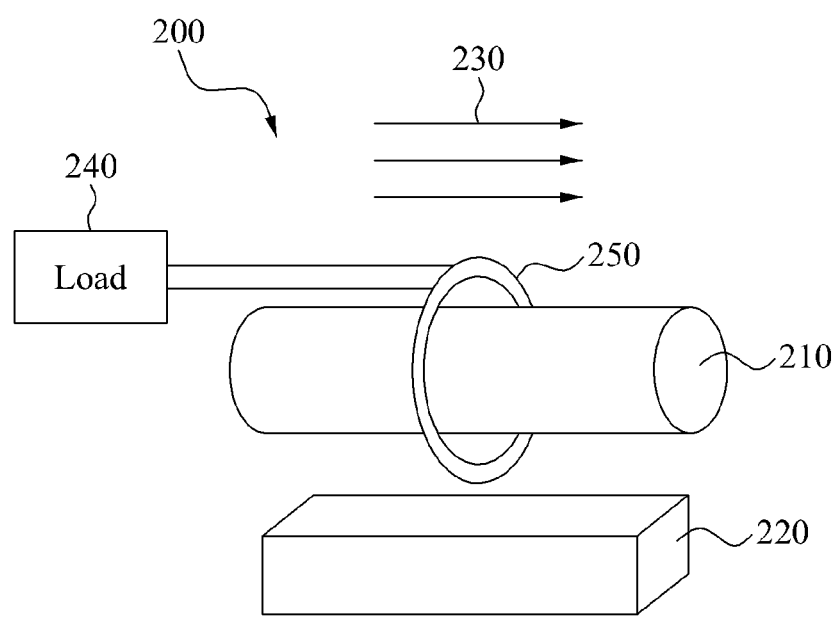
FIG. 2 is a diagram illustrating an example of a wireless electromagnetic receiver.

FIG. 2 is a diagram illustrating an example of a wireless electromagnetic receiver 200. Referring to FIG. 2, the wireless electromagnetic receiver 200 includes an inductive transducer and a solid-state resonator 210.

The inductive transducer includes a coil 250. The coil 250 is wrapped around the solid-state resonator 210 without being mechanically-connected to the solid-state resonator 210.

The solid-state resonator 210 includes a shape of a cylinder. The solid-state resonator 210 is made of a magnetostrictive material.

The wireless electromagnetic receiver 200 further includes a permanent magnet 220 configured at a side of (e.g., below) the inductive transducer and the solid-state resonator 210. The permanent magnet 220 includes a shape of a bar with a square cross-section, although other geometric shapes known to one of ordinary skill in the art may be included. The bar of the permanent magnet 220 may be approximately parallel to the cylinder of the solid-state resonator 210.

A source device produces a variable magnetic field 230 configured to excite the solid-state resonator 210, e.g., to cause the solid-state resonator 210 to oscillate. The variable magnetic field 230 is used to transfer power to the wireless electromagnetic receiver 200.

The wireless electromagnetic receiver 200 further includes a load 240. The load 240 is connected to the coil 250 via, e.g., thin conductive layers.

Figure 3:
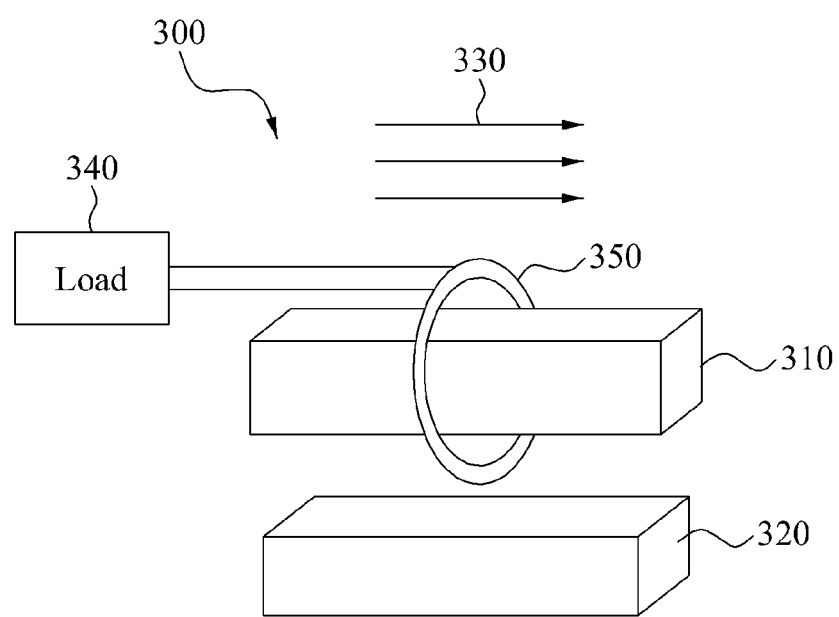
FIG. 3 is a diagram illustrating another example of a wireless electromagnetic receiver.

FIG. 3 is a diagram illustrating another example of a wireless electromagnetic receiver 300. Referring to FIG. 3, the wireless electromagnetic receiver 300 includes an inductive transducer and a solid-state resonator 310.

The inductive transducer includes a coil 350. The coil 350 is wrapped around the solid-state resonator 310 without being mechanically-connected to the solid-state resonator 310.

The solid-state resonator 310 includes a shape of a bar with a square cross-section. The solid-state resonator 310 is made of a magnetostrictive material.

The wireless electromagnetic receiver 300 further includes a permanent magnet 320 configured at a side of (e.g., below) the inductive transducer and the solid-state resonator 310. The permanent magnet 320 includes a shape of a bar with a square cross-section, although other geometric shapes known to one of ordinary skill in the art may be included. The bar of the permanent magnet 320 may be approximately parallel to the bar of the solid-state resonator 310.

A source device produces a variable magnetic field 330 configured to excite the solid-state resonator 310, e.g., to cause the solid-state resonator 310 to oscillate. The variable magnetic field 330 is used to transfer power to the wireless electromagnetic receiver 300.

The wireless electromagnetic receiver 300 further includes a load 340. The load 340 is connected to the coil 350 via, e.g., thin conductive layers.

Figure 4:
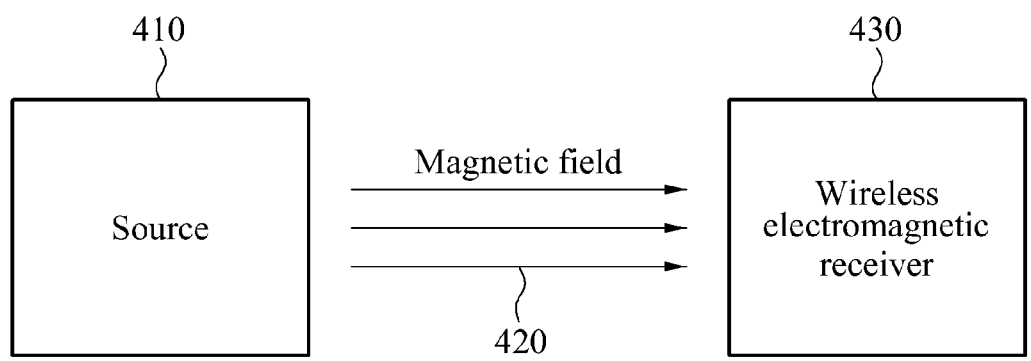
FIG. 4 is a diagram illustrating another example of a wireless power transfer system.

FIG. 4 is a diagram illustrating another example of a wireless power transfer system. Referring to FIG. 4, the wireless power transfer system includes a source device 410 and a wireless electromagnetic receiver 430.

The source device 410 generates a variable magnetic field 420, to transfer power to the wireless electromagnetic receiver 430 via the variable magnetic field 420. The wireless electromagnetic receiver 430 may include the wireless electromagnetic receiver 200 of FIG. 2 or the wireless electromagnetic receiver 300 of FIG. 3, and receives the power from the source device 410 via the variable magnetic field 420.

Referring to FIGS. 2 through 4, a first functional portion of the wireless electromagnetic receiver 430 may be represented by the solid-state resonator 210 and the permanent magnet 220 of FIG. 2, or by the solid-state resonator 310 and the permanent magnet 320 of FIG. 3. The solid-state resonator 210 or 310 may be made of a magnetostrictive material with a high Q-factor exceeding, e.g., 2000. For example, a magnetostrictive ferrite may be used as the magnetostrictive material. The solid-state resonator 210 or 310 may include a shape of a plate, a cylinder (as shown in FIG. 2), a rectangular rod or bar, a bar with a square cross-section (as shown in FIG. 3), or other geometric shapes known to one of ordinary skill in the art. The geometric shape of the solid-state resonator 210 or 310 may be selected so that the solid-state resonator 210 or 310 operates (e.g., oscillates) in a mechanical resonance mode at an operating frequency f. For example, for the solid-state resonator 210 or 310 to operate in a longitudinal mechanical resonance mode, a size of the solid-state resonator 210 or 310, in at least one dimension, may need to be approximately equal to $v/(2f)$ in which v is a sound velocity. The mechanical resonance mode may be an optimal method for power transfer in an example in which a maximum amount of mechanical energy is stored in the solid-state resonator 210 or 310, or power of mechanical oscillations of the solid-state resonator 210 or 310 includes a peak value.

The solid-state resonator 210 or 310 is biased by the permanent magnet 220 or 320 located at a short distance from the solid-state resonator 210 or 310 to ensure magnetostrictive properties of the magnetostrictive material forming the solid-state resonator 210 or 310, and to linearize a behavior of the solid-state resonator 210 or 310. The permanent magnet 220 or 320 may be made of a ceramic material. The permanent magnet 220 or 320 may be configured close to the solid-state resonator 210 or 310, without a considerable impact on a system efficiency.

The solid-state resonator 210 or 310 is excited by the variable magnetic field 230 or 330. That is, the variable magnetic field 230 or 330 generates the mechanical oscillations in the solid-state resonator 210 or 310 due to a magnetostrictive phenomenon. In the mechanical resonance mode, the variable magnetic field 230 or 330 is at a frequency matched to a resonance frequency f of the solid-state resonator 210 or 310.

An amplitude of the mechanical oscillations at the resonance frequency f depends on a Q-factor of the magnetostrictive material forming the solid-state resonator 210 or 310. That is, the higher the Q-factor, the higher the amplitude of the mechanical oscillations. Thus, for example, a magnetostrictive material of a highest Q-factor may be used to form the solid-state resonator 210 or 310. Additionally, the amplitude of the mechanical oscillations depends on the magnetostrictive properties of the magnetostrictive material forming the solid-state resonator 210 or 310. Therefore, for example, highly efficient magnetostrictive materials may be used to form the solid-state resonator 210 or 310.

Referring again to FIGS. 2 through 4, a second functional portion of the wireless electromagnetic receiver 430 may be represented by the inductive transducers of FIG. 2 or 3, which includes the coil 250 or 350 wound around the solid-state resonator 210 or 310. The coil 250 or 350 is not mechanically-connected to the solid-state resonator 210 or 310. Such a structure of the inductive transducer may ensure that the Q-factor of the solid-state resonator 210 or 310 is not reduced.

Mechanical oscillations on a surface of the solid-state resonator 210 or 310 generate a variable mechanical tension in the solid-state resonator 210 or 310, which generates a variable component of magnetization in the solid-state resonator 210 or 310 due to the inverse magnetostrictive effect. The variable component of magnetization induces voltage oscillations at ends of the coil 250 or 350. The ends of the coil 250 or 350 are connected to the load 240 or 340, to transfer the voltage oscillations as power to the load 240 or 340.

Referring again to FIG. 4, the wireless electromagnetic receiver 430 is used as a component of the wireless power transfer system. As discussed above, the wireless power transfer system includes the source device 410 configured to generate the variable magnetic field 420, to transfer power to the wireless electromagnetic receiver 430 via the variable magnetic field 420. The wireless power transfer system further includes the wireless electromagnetic receiver 430 configured to receive the power from the source device 410 via the variable magnetic field 420. A frequency of the variable magnetic field 420 generated by the source device 410 may correspond to a resonance frequency of the wireless electromagnetic receiver 430. Thus, it is possible to use various types of source devices to generate the variable magnetic field 420.

In a first example, the source device 410 may include a non-radiative resonance structure with a resonance frequency f that is located at a distance less than a wavelength λ from the wireless electromagnetic receiver 430. In this example, $\lambda = c/f$, and c denotes a speed of light. Additionally, the source device 410 and the wireless electromagnetic receiver 430 constitute a resonance system for wireless power transfer.

In a second example, the source device 410 may include a non-radiative non-resonance structure. For example, the non-radiative non-resonance structure may include a coil connected to an oscillator, and may be located at a distance less than a wavelength λ from the wireless electromagnetic receiver 430. In this example, $\lambda = c/f$, and c denotes a speed of light.

In a third example, the source device 410 may include a radiative structure with a frequency f that is located at a distance greater than a wavelength λ from the wireless electromagnetic receiver 430. In this example, $\lambda = c/f$, and c denotes a speed of light.

According to the teachings above, there is provided a wireless power transfer system, which allows a power supply required for low-power compact devices to be without cables or wires. The wireless power transfer system may be especially suitable for use in fields in which low frequencies are preferred, for example, in biological systems.

The units described herein may be implemented using hardware components, software components, or a combination thereof. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable recording mediums. The computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, optical data storage devices. Also, functional programs, codes, and code segments accomplishing the examples disclosed herein can be easily construed by programmers skilled in the art to which the examples pertain based on and using the flow diagrams and block diagrams of the figures and their corresponding descriptions as provided herein.

As a non-exhaustive illustration only, a device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless electromagnetic receiver comprising:
   a first device configured to be magnetized based on an electromagnetic field, generate mechanical oscillation based on the magnetization, and generate variable tension based on the mechanical oscillation wherein the variable tension generates variable magnetization; and
   a second device configured to transfer voltage oscillation as power to a load, wherein the variable magnetization induces the voltage oscillation at an end of the second device,
   wherein a size of the first device formed by a magnetostrictive material is inversely proportional to a resonance frequency of the first device, and
   wherein the second device surrounds a portion of the first device.

2. The wireless electromagnetic receiver of claim 1, wherein:
   the first device comprises an integral solid-state resonator made of a magnetostrictive material, the integral solid-state resonator configured to be magnetized based on the electromagnetic field; and
   the second device is configured to transform the magnetization of the integral solid-state resonator into the power, the second device being not mechanically-connected to the integral solid-state resonator.

3. The wireless electromagnetic receiver of claim 1, wherein:
   the electromagnetic field is at a frequency corresponding to a resonance frequency of the first device.

4. The wireless electromagnetic receiver of claim 1, wherein:
   the first device is made of a magnetostrictive material with a Q-factor comprising a value exceeding 2000.

5. The wireless electromagnetic receiver of claim 1, wherein:
   the first device comprises a shape so that the power comprises a peak value at an operating frequency.

6. The wireless electromagnetic receiver of claim 1, wherein:
   the first device comprises a shape of a cylinder.

7. The wireless electromagnetic receiver of claim 1, wherein:
   the first device comprises a shape of a bar with a square cross-section.

8. The wireless electromagnetic receiver of claim 1, further comprising:
   a permanent magnet configured to bias the first device.

9. The wireless electromagnetic receiver of claim 8, wherein:
   the permanent magnet is made of magnetic ceramics.

10. The wireless electromagnetic receiver of claim 1, further comprising:
    a load connected to ends of the coil.

11. A wireless power transfer system comprising:
    a transmitter configured to generate a magnetic field to transmit power; and
    a wireless electromagnetic receiver configured to receive the power from the transmitter,
    wherein the wireless electromagnetic receiver comprises
    a first device configured to be magnetized based on the magnetic field, generate mechanical oscillation based on the magnetization, and generate variable tension based on the mechanical oscillation, wherein the variable tension generates variable magnetization, and
    a second device configured to transfer voltage oscillation as power to a load, wherein the variable magnetization induces the voltage oscillation at an end of the second device,
    wherein a size of the first device formed by a magnetostrictive material is inversely proportional to a resonance frequency of the first device, and
    wherein the second device surrounds a portion of the first device.

12. The wireless power transfer system of claim 11, wherein:
    the first device comprises an integral solid-state resonator made of a magnetostrictive material, the integral solid-state resonator configured to be magnetized based on the magnetic field; and
    the second device comprises an inductive transducer configured to transform the magnetization of the integral solid-state resonator into the power, the inductive transducer being not mechanically-connected to the integral solid-state resonator.

13. The wireless power transfer system of claim 11, wherein:
the magnetic field is at a frequency corresponding to a resonance frequency of the first device.

14. The wireless power transfer system of claim 11, wherein:
the first device is made of a magnetostrictive material with a Q-factor comprising a value exceeding 2000.

15. The wireless power transfer system of claim 11, wherein:
the first device comprises a shape so that the power comprises a peak value at an operating frequency.

16. The wireless power transfer system of claim 11, wherein:
the first device comprises a shape of a cylinder.

17. The wireless power transfer system of claim 11, wherein:
the first device comprises a shape of a bar with a square cross-section.

18. The wireless power transfer system of claim 11, further comprising:
a permanent magnet configured to bias the first device.

19. The wireless power transfer system of claim 18, wherein:
the permanent magnet is made of magnetic ceramics.

20. The wireless power transfer system of claim 11, further comprising:
a load connected to ends of the coil.

21. The wireless power transfer system of claim 11, wherein the transmitter comprises:
a non-radiative resonance structure with a resonance frequency f that is located at a distance less than a wavelength $\lambda$ from the wireless electromagnetic receiver, wherein $\lambda=c/f$, and c denotes a speed of light.

22. The wireless power transfer system of claim 11, wherein the transmitter comprises:
a non-radiative non-resonance structure located at a distance less than a wavelength $\lambda$ from the wireless electromagnetic receiver, wherein $\lambda=c/f$, and c denotes a speed of light.

23. The wireless power transfer system of claim 11, wherein the transmitter comprises:
a radiative structure with a frequency f that is located at a distance greater than a wavelength $\lambda$ from the wireless electromagnetic receiver, wherein $\lambda=df$, and c denotes a speed of light.

* * * * *